United States Patent [19]

Roma

[11] 4,054,980
[45] Oct. 25, 1977

[54] PROCESS FOR MANUFACTURING MODULAR ELEMENTS AND A TUBE NEST FOR HEAT EXCHANGERS

[75] Inventor: Carlo Roma, Rome, Italy

[73] Assignee: Square S.A., Switzerland

[21] Appl. No.: 746,892

[22] Filed: Dec. 2, 1976

Related U.S. Application Data

[62] Division of Ser. No. 343,196, March 21, 1973, Pat. No. 4,030,540.

[30] Foreign Application Priority Data

Apr. 20, 1972 Italy .................................. 49783/72

[51] Int. Cl.² .......................................... B23P 15/26
[52] U.S. Cl. .............................. 29/157.3 R; 165/172
[58] Field of Search .................. 29/157.3 C, 157.3 R, 29/466

[56] References Cited

U.S. PATENT DOCUMENTS

3,391,041   7/1968   Moore ............................ 29/157.3 R

Primary Examiner—C.W. Lanham
Assistant Examiner—V. Rising
Attorney, Agent, or Firm—Hill, Gross, Simpson, Van Santen, Steadman, Chiara & Simpson

[57] ABSTRACT

A process for making modular element for heat exchangers with thermoplastic tubes consisting of a plurality of tubes connected to one another by spacers located at intervals allowing the mutual tape-like positioning of the tubes. Also a process for making a tube nest consisting of a plurality of such modular elements.

10 Claims, 15 Drawing Figures

PROCESS FOR MANUFACTURING MODULAR ELEMENTS AND A TUBE NEST FOR HEAT EXCHANGERS

This is a division, of application Ser. No. 343,196, filed Mar. 21, 1973 now U.S. Pat. No. 4,030,540, issued June 21, 1977.

The present invention relates to heat exchangers consisting of tubes of the thermoplastic material, suitable for fluid under non high pressure and temperature, and thereby compatible with the nature of the materials forming the tubes themselves.

Said heat exchangers can be used for instance, and only by way of non limitative example, for refrigerating by means of air, the steam condensing water, in thermoelectric power plants.

More particularly, the object of the present invention is the structural arrangement of the tube nests of the heat exchangers, with reference, among others, to the mutual spacing apart and positioning of the tubes, so as to form a modular element, and to the connection of the tubes themselves (forming the exchange surface) to the manifolds supplying the fluid to the single tubes.

Another object of the present invention is the manufacturing process of the single modular elements and the connection of said elements to each other, so that more modular elements will form an extremely simple, economical tube nest, also having a very large surface and very great dimensions.

The manufacturing process allows also the embodiment of the modular elements also with very long tubes, which after their assembling to form the modular element, can be easily transported as the modules are wound on a reel, and are subsequently unwound so that at the mounting space said modules can be connected to one another and held together by a frame, forming thus an exchanger with right tubes, with no intermediate coupling, suitable to form heat exchangers with a reduced number of connections between the tubes and the manifolds.

In the prior art, a particularly important problem was the connection system of the tubes to the tubehead and to the manifolds, due to the scarce safety offered by said connections for an entire reliability of the seals, and this system was always very expensive. Very important is also the solution of the positioning problem and of the mutual spacing apart of the tubes so as to allow the positioning and spacing apart of the tubes also for very long tubes, in order to ensure the geometrical features, i.e. the longitudinal and transversal pitch between the centres of the single tubes, suitable to er. body the optimum geometric arrangement for the thermal exchange.

Certain other features are present in the type of exchanger according to the present invention, furthermore, namely the mounting possibility of assembling various standard elements; the manufacturing process allowing in the same time to transport very long modular elements with a very reduced cost and to obtain tube nests the dimensions of which were not attainable by the prior art, with the economy which can be obtained by the present invention.

All advantages and features above indicated are rendered possible by the manufacturing process according to this invention utilizing the flexibility of the thermoplastic tubes and according to which it is provided of:

a. winding or unwinding said tubes, individually or in groups of more tubes, on reels or coils;

b. connecting more tubes by means of suitable spacers, made of two parts, consisting of thermoplastic material, located along the axis of the tubes, at suitable intervals;

c. connecting to one another the spacers in order to allow the mutual positioning of the tubes until forming the tube nest proper;

d. allowing the connection of the ends of the tubes to the manifolds supplying the fluid into the tubes themselves by means of contrivances safely effective, reliable and economical.

The present invention will be now described with reference to certain embodiments thereof at present preferred, shown by way of non-limitative example and with reference to the attached drawings, wherein.

Figures 1, 2A:
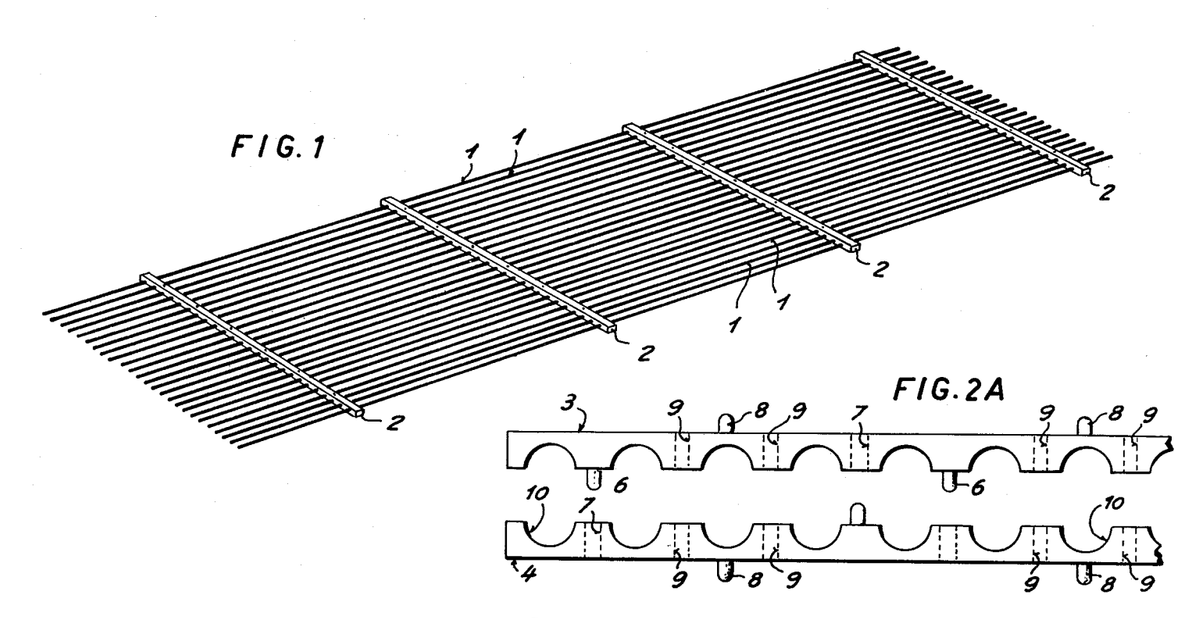
FIG. 1 diagrammatically shows a modular element according to the present invention.
FIGS. 2A, 2B, 2C show a spacer element component of the modular element of FIG. 1.
Figure 2B:
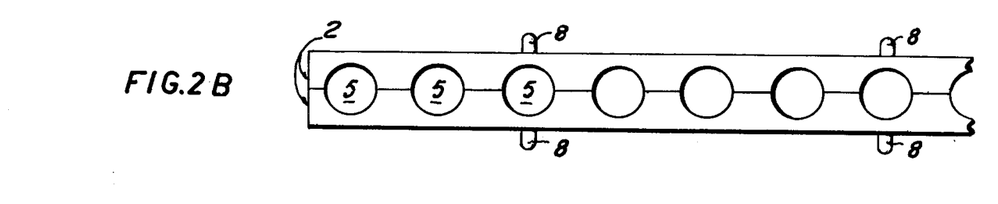
Figure 2C:
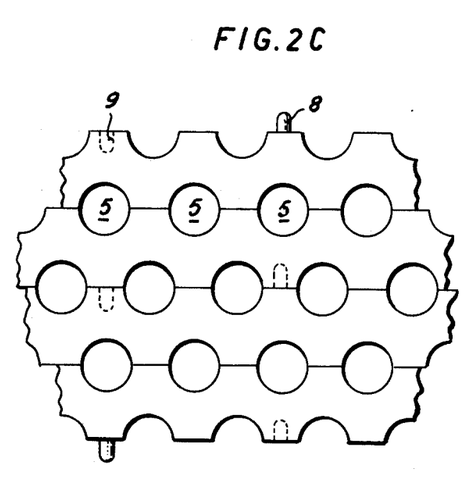

With reference to FIG. 1, the numeral reference 1 shows a plurality of tubes, having whatsoever cross sectional shape, either circular or not circular, the axes of which are parallel, as the tubes 1 are held and kept spaced apart from each other by the positioning and spacing elements 2, better shown in the FIGS. 2A, 2B, 2C located along the axes of the tubes 1, at suitable intervals.

With reference to FIGS. 2A, 2B, 2C, the spacer element 2 is also made of thermoplastic material, made of two halves 3 and 4, so that when the two halves have been joined, an element will be embodied, provided with the holes 5 suitably spaced apart from one another.

The two halves of the element 2 (see FIG. 2A) are provided with the pin and bore joint members 6 and 7 respectively, serving the function of connecting to one another the two halves so as to form a single element 2; the pin or gudgeon member 8 and the bore member 9 serve also the function of connecting together more elements 2 until forming a tube head obtained by assembling the elements themselves, as shown in FIG. 2C. The connection of the members can be obtained either by friction or by insertion of the pin member into the bore member and the joint members can have the most different forms, namely conical, cylindrical, with the bore cylindrical while the pin member has a cross-like form, with rectangular or square shape cross-section, etc., and can be located in whatever position on the spacers.

Each single element 2, in two separate parts 3 and 4 is mounted on the tubes and when the two parts are closed, the element 2 establishes the mutual positioning of the axes of the tubes of a single modular element, as the tubes 1 are received within the holes 5 of the element 2.

By placing at regular intervals, along the axes of the tubes, more elements 2, the purpose will be attained of maintaining parallel to one another the axes of the tubes which in the illustrative example of FIG. 1 are all contained in one plane.

For mounting the modular element, the tubes can already be predisposed in suitable lengths and inserted into the seat 10 of one of the two halves, for instance the lower half part 4 of the spacer element 2; then the second half part 3 of the spacer element 2 will be placed on the lower half, and the joints 6 and 7, shown by way of example in FIG. 2A, are connected in order to connect the two half-elements 3 and 4 which will form a single spacer 2.

Figures 3, 4, 5:
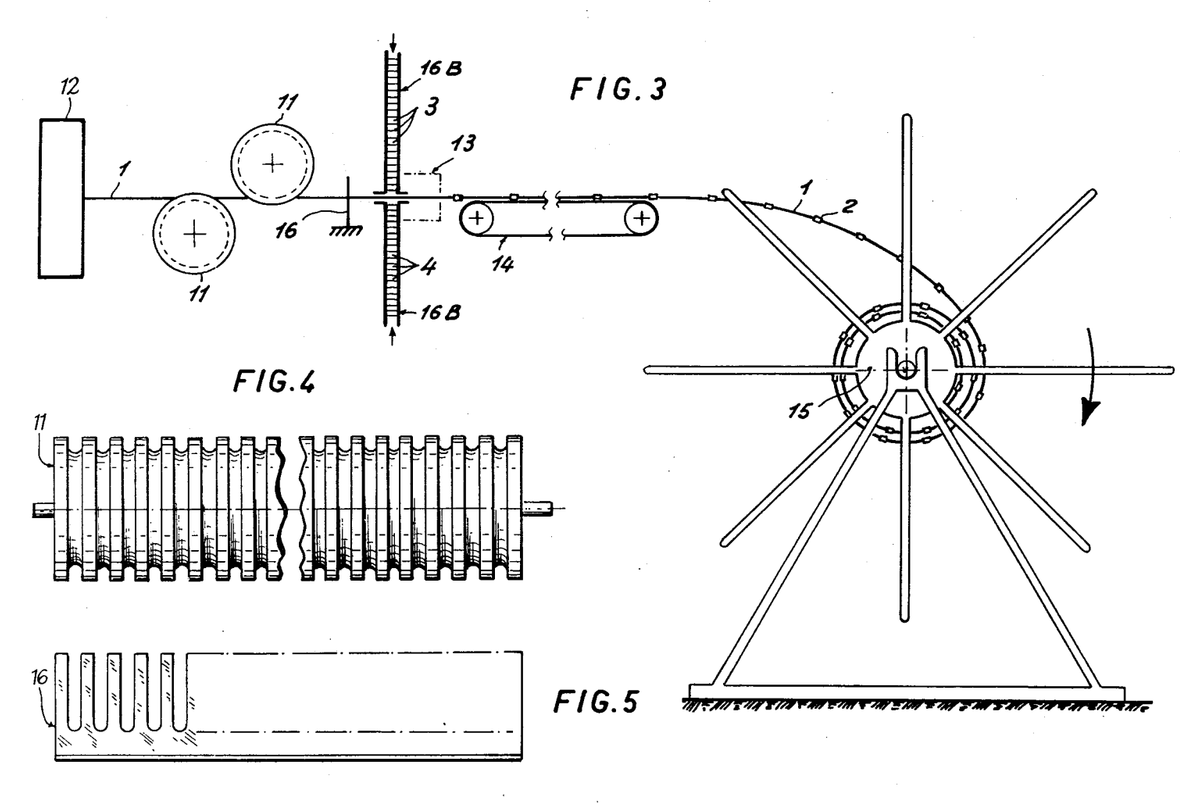
FIG. 3 shows a scheme of the constructive and mounting process for obtaining by a power operated system the modular element of FIG. 1.
FIG. 4 shows a roller used for spacing apart the tubes by the power operated process.
FIG. 5 shows a stationary comb-like spacer which can be used in order to obtain the spacing and the positioning of the tubes by the power operated process for making the modules.

FIG. 3 diagrammatically shows another mounting process which is easy to embody as it is power operated and it uses spacer and/or conveyor rollers 11 or equivalent mechanical devices; the conveyor rollers 11 and/or the mechanical equivalent devices are provided with comb-like or groove-like devices which serve the function of holding constant the distances between the axes of the termoplastic tubes 1.

The tubes 1 feed the spacer roller 11 and/or the conveyor 14 as each tube comes either from a supply reel or directly from extrusion heads followed by the associated systems for cooling the tube, the reels or the extrusion systems being diagrammatically shown at 12 in FIG. 3.

The roller or rollers 11, the spacers 16 and/or the conveyor or the conveyors 14 cause the tubes 1 to forwards move, and said tubes are received into the spacer positioning members 2, as shown in FIGS. 2A, 2B, 2C, and this operation can be carried out either manually or by a power operated system.

The forwards movement of the tubes 1 can also be obtained by means of a collecting reel 15 and the spacing of the tubes coming from the feeding system 12 can also be made by means of stationary comb-like or ring-like elements 16, immersed if the case may be into a liquid bath, serving the function of cooling the combs or the rings. The numeral reference 14 denotes a conveyor tape supporting the modular element and which can be located before the collecting reel.

The FIG. 5 shows a detail of a spacer comb-like element as shown by 16 in FIG. 3, within the grooves of which can slide the tubes 1 coming from the system 12.

In FIG. 3, the numeral reference 16B denotes guides which form a reservoir for the spacer half-elements shown by 3 and 4 in FIG. 2A. The two half elements can also be mechanically connected as it is shown only by way of non limitative example in FIG. 6.

Figure 6:
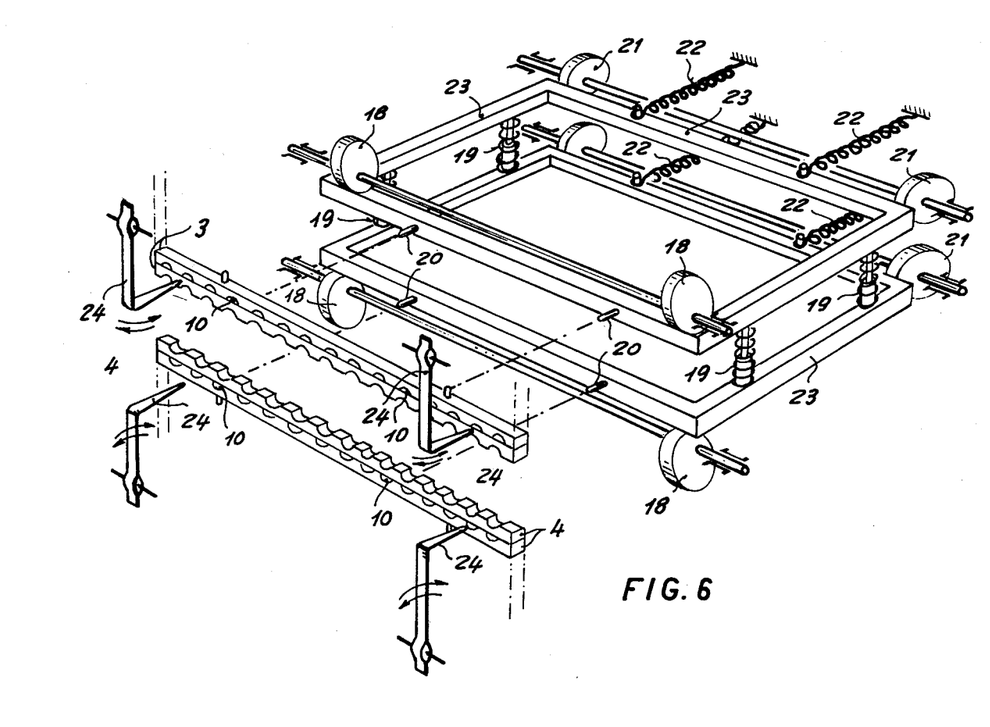
FIG. 6 shows the scheme of a possible equipment for connecting to one another the two halves of the spacers by the power operated process for making the modules.

In FIG. 6 a system of contrast springs 22 and cams 21 allows a to and from movement within guides not shown in figure for the pins 20 connected to two frams 23, so that the pins 20 can enter into the seats 10 of the spacer half elements 3 and 4.

A system of cams 18 and of contrast springs 19 allows for the two frames 23 a mutual nearing and spacing away movement which causes the pins 20 to press against one another the two half-elements 3 and 4 and to carry out mechanically their connection, for instance by means of the pins 6 and the bores 7 as shown in FIG. 2A. The levers 24 with the return springs not shown in the figure allow, furthermore the connection to one another of one half element 3 and 4 at the time.

The movements of the cams 18 and 21 and the feeding movement of the tubes 1 are timed with one another.

When the tubes have been moved forward through the desired length in order to obtain a modular element or multiples thereof, the tubes are cut from the reel, and the modular element as shown in FIG. 1 will be thus completed.

The so mounted modular element can be wound around a collecting reel during its manufacture, and sequentially, (and this is rendered possible by the flexibility of the thermoplastic tubes) on the same reel it will be possible to wound more than one modular element of FIG. 1.

Figures 7, 8, 10A, 10B, 10C:
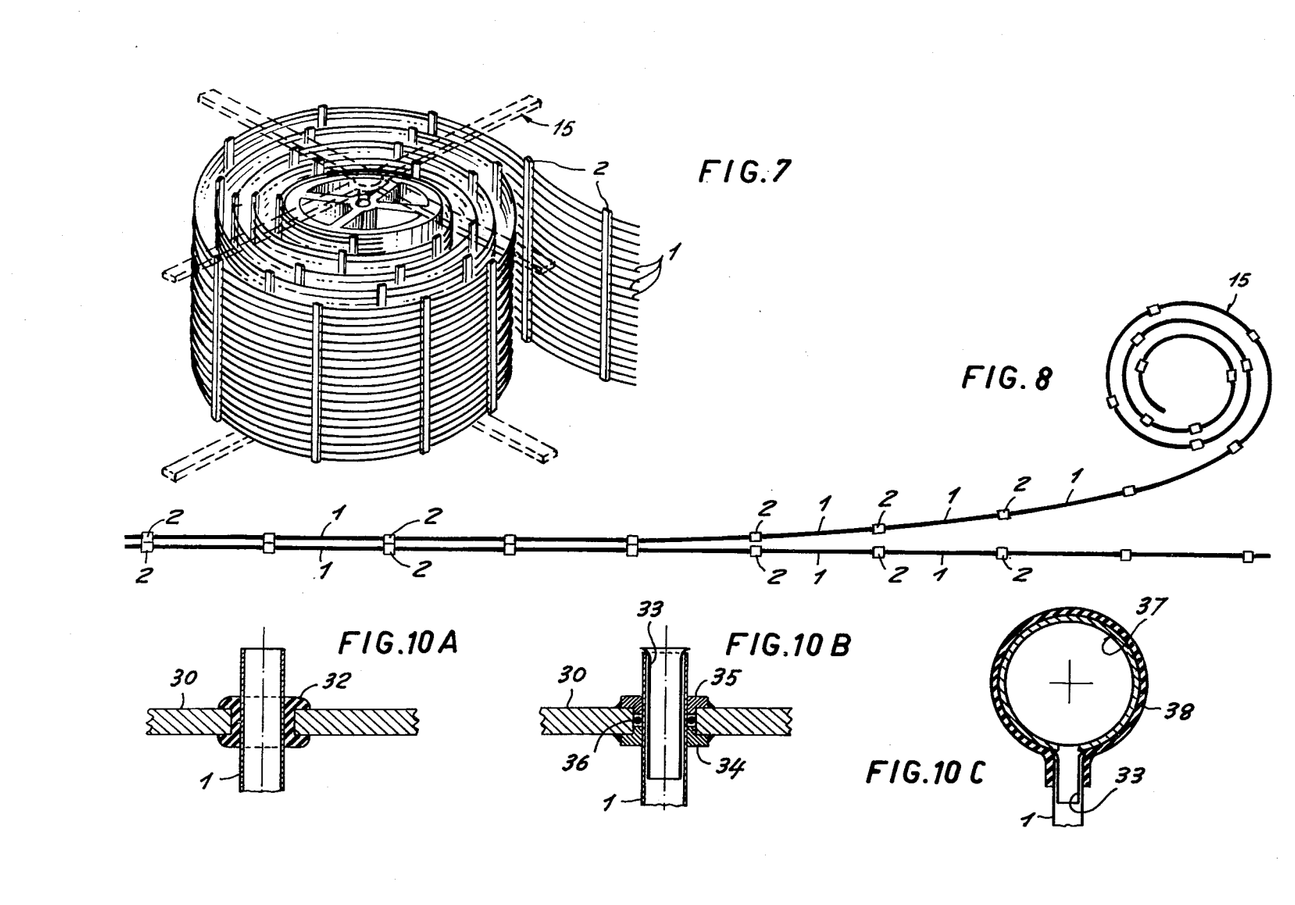
FIG. 7 shows one or more modular elements wound on a reel and ready to be transported.
FIG. 8 shows a scheme of the mounting system and process for obtaining from more modules the tube nest.
FIGS. 10A, 10B, 10C show some connections of the ends of the tubes forming the tube nest to manifolds supplying the fluid to the single tubes.

FIG. 7 shows, accordingly, one reel on which the modular elements ready for their possible transportation are wound.

With reference to FIG. 8, a mounting process will be described which starting from the modules allows the tube nest to be obtained.

One of the modules will be unwound from one reel 15 containing one or more modules, and the unwound module will be located on a plane formed if the case may be, by the same frame which is destined to support the tube nest when mounted.

Subsequently, from the same reel 15 or from other reels, a second module will be unwound and located above the module previously located on the plane so that the respective spacers 2 of the two modules will be located on one another.

In fact the first spacer 2, counted starting from the end of the tubes forming the first module can be located in contact with the first spacer 2, counted as above described, of the module which has been subsequently located above the first.

The same condition occurs also for all the spacer elements 2 of both modules, which must contact, accordingly, the second spacer of the first module with the second spacer of the second module which has been subsequently superposed respectively and so on.

Each of the superposed spacers 2 will be positioned with respect to the other so that the joint members 8 and 9 shown in FIG. 2A located outside of the spacers will be inserted into one another by a suitable pressure.

In this case by arranging the pin member 8 of the joint in respect of the bore 9 it will be possible either to stagger or not to stagger the axes of the tubes of the two modules, embodying thus an aligned arrangement or a staggered arrangement, so as to obtain a rectangular, or square or triangular arrangement of the centres of the single tubes pertaining to contigous lines.

The superposing operation of the modules continues sequentially until, a tube nest has been obtained by locating more modules on one another.

Figure 9:
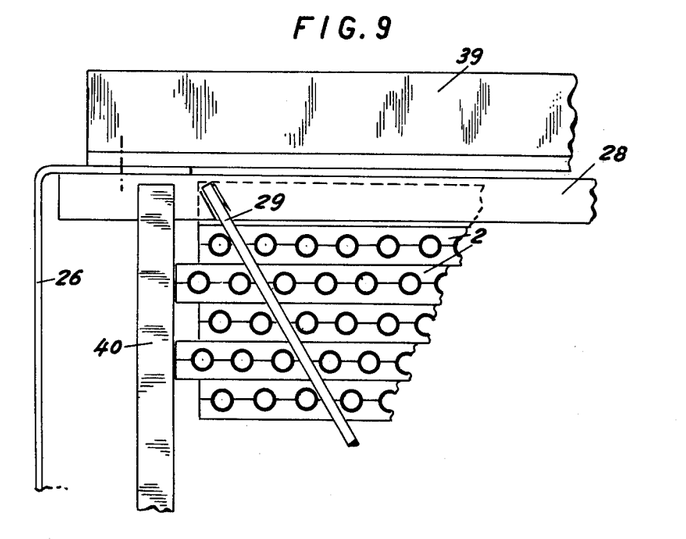
FIG. 9 shows more modular elements connected to one another until forming the tube nest.

FIG. 9 shows more modules connected to one another by the spacers 2 and already mounted in a frame.

Figure 11:
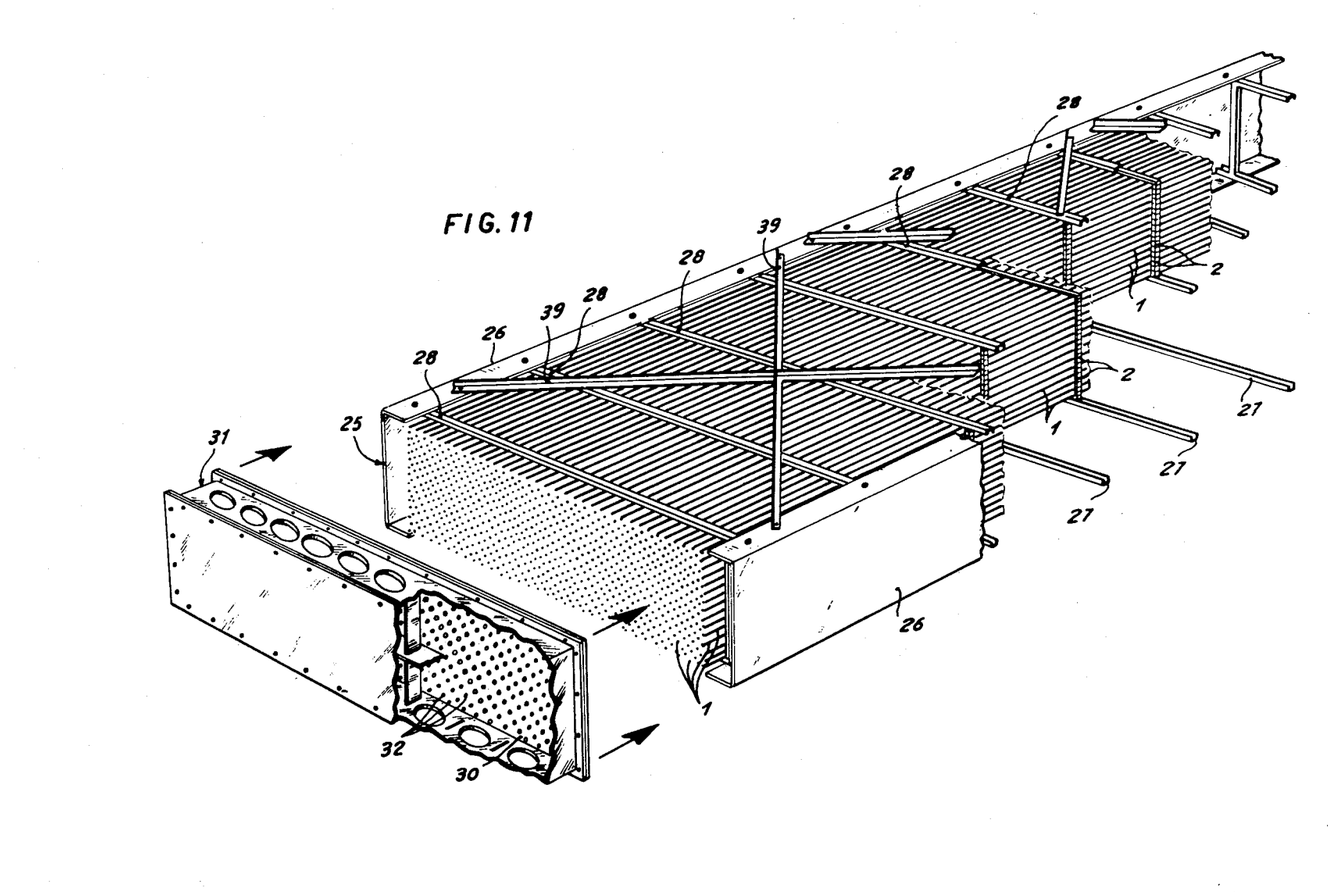
FIG. 11 diagrammatically shows in exploded view a tube nest obtained by the manufacturing process.

FIG. 11 shows the elements of the finished nest consisting of the frame 25 formed by two longitudinal beams 26, by many cross members 27 connecting said beams and which can be shaped so as to collect the bases of the plate which has been formed due to the mutual connection, on one another, of the single spacers 2.

The frame 25 can be completed by other cross members 28 suitably connected to the beams 26 and can include also tie-rods 29 and sections 40 shown in FIG. 9 for connecting to one another the cross-members 27 and 28.

The beams 26 can also be connected with the cross-like tie rods 39.

The ends of the tubes 1 are connected to manifolds 31 of either tube head type and/or tubular type.

The FIG. 10A shows a kind of connection effected between the tubes 1 and the tubehead 30 through which holes have been made.

Within said holes the sleeves 32 made of rubber or other sufficiently elastic material are located, and after lubrication or in the absence thereof, into the hole of the sleeve the end of each tube 1 will be inserted. The insertion of the tubes into the holes of the sleeve 32 can be made before the module to which pertain the tubes which are inserted into the holes of the sleeves will be covered by the subsequent module.

The rubber sleeve 32 can have its outer surface and/or its inner hole either smooth or bowed or corrugated, etc.

Inside the plastic tube it is possible to insert a metal bushing 33 (FIG. 10B) which is capable of preventing the tube from being pressed flat.

The FIG. 10b in fact shows the insertion of the ends of the tubes into the hole made through the tubehead of a manifold which shows two circlips; the fixed circlip 34 which has been inserted into the hole and connected to the tubehead by electric or resistance welding, and a second circlip 35 which is subsequently inserted into the same hole until pressing the O-ring 36 which adheres to the outer surface of the thermoplastic tube 1 and to the hole, embodying thus the seal.

Inside the thermoplastic tube 1 a metal bushing 33 will be inserted so as to avoid the tube to be crushed by the O-ring 36.

The circlip 35 will be then pressed and connected to the tubehead 30 by electrowelding dots or by resistance welding dots or by glueing, etc.

The FIG. 10C shows another type of connection; 37 is a metal tube forming a manifold element which can have a circular or non circular cross section, along a generatrix of which are provided the holes into which are received the metal nipples 33 suitably connected to the manifold 37 by means of welding, glueing by resins, mechanical fixing, etc.

On said nipples which have an external diameter equal to, or slightly lesser, than the internal diameter of the thermoplastic tubes 1, are inserted the thermoplastic tubes 1 themselves, so as to embody the unit as shown in the FIG. 10C.

The so obtained piece is inserted into a suitable mould for moulding thermoplastic material of the same nature as that forming the tubes.

The mould which consists of two halves, allows a layer of thermoplastic material 38 to be deposited on the outer surface of the manifold 37, on the outer surface of the ends of the tubes 1 inserted on the nipples 33, by injection of the plastic material.

The advantages obtained by the manufacturing system as above described are those of enabling the embodiment of a very economical exchanger, as the spacing operations of the tubes do not require that they are carried out individually for each tube at the moment of the construction of the exchanger, this being, as it is known, the most time consuming operation of the embodiment.

Also the operation for connecting the ends of the tubes to the manifolds is embodied by a reliable system as far as the seal is concerned, both in case of conventional manifold of the tubehead type, and in case of manifold obtained by covering of a metal tubular manifold by thermoplastic material of the same nature of the tubes.

Moreover, the manufacturing system and the mounting of the modules allows their transportation, even if formed by very long tubes, by winding of the modules and subsequent unwinding thereof, rendering thus possible the embodiment of very economical exchangers.

The surface of the exchangers can be extended at will by combination or connection of more modules, obtained by the described mounting and manufacturing process.

In the specification of the present invention, reference has been made, by way of example, to one or more particular embodiments, but it will be understood that modifications can be adopted without departing from the scope of the present industrial privilege.

Having thus described the present invention, what is claimed is:

1. A process for making a tubular assembly which forms modular elements for tube nests comprising the steps of:
   a. providing a supply of flexible thermoplastic tubes in parallel alignment;
   b. pulling the thermoplastic tubes from the supply;
   c. spacing the thermoplastic tubes a uniform distance from one another;
   d. providing in guide means a supply of upper half element spacers to one side of the thermoplastic tubes and a supply of lower half element spacers in guide means to the other side of the thermoplastic tubes, said spacers having seating grooves;
   e. mating the upper and lower half element spacers so as to capture and space the thermoplastic tubes in the seating grooves; and
   f. winding the tubing assembly of thermoplastic tubes with spacers in a roll.

2. The process of claim 1 in which the tubular assembly is cut into predetermined length modular elements prior to the winding.

3. The process of claim 1 in which the thermoplastic tubes are both spaced and pulled from the supply by a roller having a plurality of spaced, circular grooves.

4. The process of claim 1 in which the mating of the upper and lower element spacers occurs at ends of the guide means and includes the steps of providing pin and mating apertures in the upper and lower half elements, providing means for releasing individual half elements from the guide means, and moving the released upper and lower half elements with pins and mating apertures into engagement.

5. A process for making a tube nest from modular elements comprising the steps of:
   a. providing modular elements formed of a plurality of parallel, flexible thermoplastic tubes spaced a uniform distance from one another by spacers, said modular elements being wound on at least one roll;
   b. unwinding from at least one roll a first modular element;
   c. unwinding from at least one roll a second modular element; and d. aligning the second modular element above the first modular element such that spacers of the first modular element abut against spacers of the second modular element.

6. The process of claim 5 in which the modular elements are provided according to the following steps:
   a. providing a supply of flexible thermoplastic tubes in parallel alignment;
   b. pulling the thermoplastic tubes from the supply;
   c. spacing the thermoplastic tubes a uniform distance from one another;
   d. providing in guide means a supply of upper half element spacers to one side of the thermoplastic tubes and a supply of lower half element spacers in guide means to the other side of the thermoplastic tubes, said spacers having seating grooves;
   e. mating the upper and lower half element spacers so as to capture and space the thermoplastic tubes in the seating grooves; and
   f. winding a tubing assembly formed by the thermoplastic tubes with spacers in a roll for use as the modular elements.

7. The process of claim 5 including the further step of engaging the abutting spacers of the first and second modular elements by pin and groove means.

8. The process of claim 5 including the further step of providing a manifold means and individually inserting the cut ends of the first modular element before aligning the second modular element over the first modular element, said inserting of the cut ends being achieved by flexing each flexible tube into an aperture of the manifold means.

9. The process of claim 5 in which only one roll of continuous modular elements is provided for at least the first and second modular elements which are formed by unwinding the one roll and cutting at predetermined lengths of the modular elements.

10. The process of claim 5 including the further step of positioning a third modular element alongside the first modular element.

* * * * *